(12) United States Patent
Guo et al.

(10) Patent No.: US 10,711,486 B2
(45) Date of Patent: Jul. 14, 2020

(54) LOCK CLUTCHES AND METHODS OF MAKING AND USING THEREOF

(71) Applicant: Scyan Electronics LLC, Sammamish, WA (US)

(72) Inventors: Yan Guo, Sammamish, WA (US); Henry Guo, Issaquah, WA (US)

(*) Notice: Subject to any disclaimer, the term of this patent is extended or adjusted under 35 U.S.C. 154(b) by 90 days.

(21) Appl. No.: 15/491,979

(22) Filed: Apr. 20, 2017

(65) Prior Publication Data
US 2017/0306652 A1 Oct. 26, 2017

Related U.S. Application Data

(60) Provisional application No. 62/325,052, filed on Apr. 20, 2016.

(51) Int. Cl.
| | | |
|---|---|---|
| E05B 17/04 | (2006.01) | |
| E05B 47/06 | (2006.01) | |
| F16D 23/12 | (2006.01) | |
| F16D 11/14 | (2006.01) | |
| F16D 23/00 | (2006.01) | |
| E05B 47/00 | (2006.01) | |
| E05B 15/04 | (2006.01) | |

(52) U.S. Cl.
CPC .......... *E05B 17/044* (2013.01); *E05B 17/045* (2013.01); *E05B 47/068* (2013.01); *F16D 11/14* (2013.01); *F16D 23/00* (2013.01); *F16D 23/12* (2013.01); *E05B 47/0012* (2013.01); *E05B 2015/0496* (2013.01); *E05B 2047/0026* (2013.01); *E05B 2047/0028* (2013.01); *E05B 2047/0031* (2013.01)

(58) Field of Classification Search
CPC ................. E05B 17/044; E05B 17/045; E05B 2047/0014; E05B 2047/0018; E05B 2047/0026; E05B 2047/003; E05B 2047/0031
See application file for complete search history.

(56) References Cited

U.S. PATENT DOCUMENTS

| | | | | |
|---|---|---|---|---|
| 3,939,679 A * | 2/1976 | Barker | ................... | E05B 47/068 70/277 |
| 6,845,642 B2 * | 1/2005 | Imedio Ocana | ...... | E05B 47/068 70/222 |
| 7,096,697 B2 * | 8/2006 | Keightly | ............. | E05B 47/0012 292/142 |
| 7,543,469 B1 * | 6/2009 | Tseng | .................... | E05B 47/026 292/142 |
| 7,966,854 B2 * | 6/2011 | Imedio Ocana | .... | E05B 47/0642 192/69.62 |
| 8,141,400 B2 | 3/2012 | Sorensen | | |

(Continued)

*Primary Examiner* — Christopher J Boswell

(57) ABSTRACT

A clutch assembly for a lock includes a driver (1), having a driver shaft (9); a coupler (3); and a follower (2). The driver (1), the coupler (3) and the driver shaft (9) are configured to rotate concentrically together. The coupler (3) is configured to move along the central axis of the driver shaft (9) to couple to or decouple from the follower (2). The driver (1) and the follower (2) are configured to rotate concentrically together when the coupler (3) is engaged to the follower (2), and wherein the driver (1) and the follower (2) are configured to rotate independently when the coupler (3) is disengaged from the follower (2).

5 Claims, 6 Drawing Sheets

(56) References Cited

U.S. PATENT DOCUMENTS

| | | | |
|---|---|---|---|
| 8,516,865 B2* | 8/2013 | Ferreira Sanchez | ......................... E05B 47/0012 70/472 |
| 8,931,315 B2 | 1/2015 | Frolov | |
| 9,051,762 B2* | 6/2015 | Huang | ................ E05B 47/0012 |
| 2002/0144526 A1* | 10/2002 | Ming-Chih | ........... E05B 47/068 70/218 |
| 2003/0150248 A1* | 8/2003 | Wu | ...................... E05B 55/005 70/224 |
| 2004/0177660 A1* | 9/2004 | Tsai | ..................... E05B 47/068 70/223 |
| 2009/0133454 A1 | 5/2009 | Frolov | |
| 2010/0294008 A1 | 11/2010 | Bogdanov | |
| 2014/0250956 A1 | 9/2014 | Chong | |
| 2015/0211257 A1* | 7/2015 | Boesel | ................. E05B 17/045 303/89 |

\* cited by examiner

LOCK CLUTCHES AND METHODS OF MAKING AND USING THEREOF

CROSS REFERENCE TO RELATED APPLICATIONS

This application claims the benefit of the filing date of U.S. Provisional Application Ser. No. 62/325,052 filed Apr. 20, 2016 under 35 U.S.C. 119(e), the entire disclosure of which is incorporated by reference herein.

TECHNICAL FIELD

The disclosure relates generally to locks and locking devices, and particularly to lock parts, assemblies and components.

BACKGROUND

Unless otherwise indicated herein, the materials described in this section are not prior art to the claims in this application and are not admitted being prior art by inclusion in this section.

A lock is a mechanical or an electronic device for restricting access to an enclosed property. More specifically, the lock is adapted to protect against forced and surreptitious entry to the enclosed property or the area. The lock may be used on a door, furniture, a vehicle, a container such as a storage box, or a bike.

A clutch mechanism inside a lock system often leads to coupling or uncoupling of various components in the lock therefore locking or unlocking the lock system.

SUMMARY

The following summary is illustrative only and is not intended to be in any way limiting. In addition to the illustrative aspects, embodiments, and features described above, further aspects, embodiments, and features will become apparent by reference to the drawings and the following detailed description.

In one aspect, the disclosure provides clutches for locks. In one embodiment, the disclosure provides a clutch assembly for a lock. The clutch assembly includes a driver (1), having a driver shaft (9), a coupler (3) and a follower (2). The driver (1), the coupler (3) and the driver shaft (9) are configured to rotate concentrically together. The coupler (3) are configured to move along the central axis of the driver shaft (9) to engage or disengage the follower (2). The follower (2) is configured to rotate concentrically together with the driver (1), the coupler (3) and the driver shaft (9) when engaged with the coupler (3). On the other hand, the follower (2) is configured to rotate independently from the driver (1), the coupler (3) and the driver shaft (9) when disengaged from the coupler (3).

In one embodiment, the clutch assembly may include a power source (8). The power source may be operably connected to the coupler (3) and is configured to move the coupler (3) along the central axis of the driver shaft (9) in a back and forth motion. When the coupler (3) is moved forward, the coupler (3) engages with the follower (2) connecting the driver (1), the driver shaft (9), the coupler (3) and the follower (2) causing these components to be able to rotate concentrically together. When the coupler (3) is moved back, the coupler (3) disengages from the follower (2), which disconnects the follower (2) from the driver (1), the driver shaft (9), and the coupler (3).

In some embodiments, the power source (8) is a motor such as an electric motor. In some embodiments, the power source (8) is a manually operated device. In some embodiments, the power source (8) is operably connected to an actuating arm (4). The actuating arm (4) is operably connected to the coupler (3). The power source (8) is configured to move the actuating arm (4), which causes the coupler (3) to move along the central axis of the driver shaft (9) causing the coupler (3) to disengage from or engage with the follower (2). In some embodiments, the power source (8) is a motor, the motor may include a rotation shaft (7) and rotation shaft (7) is operably connected to the actuating arm (4). The motor (8) may be configured to rotate the actuating arm (4) through the interaction between the rotation shaft (7) and the actuating arm (4).

In some embodiments, the actuating arm (4) may have a first end and the second end. The first end is operably connected the rotation shaft (7). The second end is operably connected to the coupler (3). In one embodiment, the first end may include a spring (6) and the spring (6) is configured to rotate with the rotation shaft (7) causing movement on the actuating arm (4). In one embodiment, the second end may include a hook (5) that is configured to hook on the coupler (3).

In some embodiments, the driver shaft (9) may include a polygon-shaped cross-section. The polygon may be any polygon shape including without limitation a triangle, a square, a rectangle, a tetrahedral, a pentagon, a hexagon, a heptagon, or an octagon. In some embodiments, the coupler (3) may include a polygon-shaped central bore (16). The driver shaft (9) may have a polygon-shape like the polygon-shape of the central bore. The coupler (3) may be threaded onto the driver shaft (9) through the polygon-shaped central bore (16).

In some embodiments, the coupler (3) may have a first coupling structure and the follower (2) may have a second coupling structure (15). The first coupling structure (12) may be configured to engage with the second coupling structure (15). The coupler (3) and the follower (2) are configured to rotate concentrically together when the first and the second coupling structure are engaged. In one embodiment, the first coupling structure may include at least one protruding structure and the second coupling structure may include at least one indenting structure. The protruding structure may be configured to mate with the indenting structure. In some embodiments, the first coupling structure (12) may be a teethed structure. In some embodiments, the second coupling structure (15) may be a teethed structure. In some embodiments, the first coupling structure (12) may be configured to mate with the second coupling structure (15).

In some embodiments, the clutch assembly may further include a clutch or a deadbolt operably connected to the follower (2). The rotation of the follower (2) is configured to produce a linear motion on the clutch or the deadbolt.

In some embodiments, the clutch assembly further includes a control member (11). The control member (11) may be operably coupled to the driver (1) such that the control member (11), the driver (1), the driver shaft (9) and the coupler (3) are configured to rotate concentrically together. In some embodiments, when the coupler (3) is engaged with the follower (2), the follower (2) is configured to rotate concentrically together the control member (11), the driver (1), the driver shaft (9), and the coupler (3). When the coupler (3) is disengaged from the follower (2), the follower (2) is disconnected from the control member (11), the driver (1), the driver shaft (9) and the coupler (3).

In some embodiments, the clutch assembly may further include a clutch or a deadbolt operably connected to the follower (2). Rotating the follower (2) is configured to produce a linear motion on the clutch or the deadbolt. Therefore, when the coupler (3) is engaged with the follower (2), the control member (11) is operably connected to the clutch or the deadbolt. Rotating the control member (11) is configured to produce a linear motion on the clutch or the deadbolt. In some embodiments, the control member may be any shape or size such as, without limitation, a knob, a handle, a round structure, an oval structure, an oblong structure, or a polygon structure.

In another aspect, the disclosure provides locks having the clutch assembly disclosed thereof. In one embodiment, the lock is a lock system. In one embodiment, when the coupler (3) is engaged with the follower (2), an operator can retract or extend the clutch or the deadbolt of the lock by rotating the control member (11) clock or counter-clock wise allowing the lock to go into an unlocking or locking mode. When the coupler (3) is disengaged from the follower (2), the control member (11) is disconnected from the clutch or the deadbolt allowing. Rotating the control member (11) has no affect on position of the clutch or deadbolt.

In some embodiments, the lock further includes an authenticating device. The authenticating device is configured to authenticate an operator and to control the engagement and disengagement between the coupler (3) and the follower (2). When the coupler (3) engages with the follower (2), the control member (11) is operably connected with the clutch or the deadbolt. When the coupler (3) disengages from the follower (2), the control member (11) is operably disconnected from the clutch or deadbolt. In one embodiment, when the authenticating device authenticates the operator, the coupler (3) engages with the follower (2) allowing the operator to extend or retract the clutch or deadbolt by rotating the control member (11) and therefore locking or unlocking the lock.

In some embodiments, the authenticating device may be a key operated lock mechanism, a biometric authenticating mechanism, a passcode authenticating mechanism, or a wireless sensing device. In one embodiment, the lock may include at least two of the authenticating devices selected from a key operated lock mechanism, a biometric authenticating mechanism, a passcode authenticating mechanism, or a wireless sensing device. In one embodiment, the lock may include at least three of the above authenticating devices.

The biometric sensing mechanism may be configured to authenticate a fingerprint, an iris pattern, a cardio-electromagnetic wave, a voice, a sound combination, a gesture, or a combination thereof. The wireless sensing device may be configured to receive an authenticating signal from a mobile device. For example, the authenticating signal from a mobile device may include an authenticating signal derived from authenticating a fingerprint, an iris pattern, a cardio-electromagnetic wave, a voice, a sound, a gesture, or a combination thereof.

In a third aspect, the disclosure provides lock system kits including the clutch assembly disclosed thereof.

In a fourth aspect, the disclosure provides doors including the lock system described thereof.

The representative embodiments of the disclosure include:

A clutch assembly for a lock system, comprising a driver assembly, comprising a driver (1), a driver shaft (9); and a coupler (3), wherein the driver (1), the coupler (3) and the driver shaft (9) are configured to rotate concentrically together; and a follower (2), wherein the coupler (3) are configured to move along the central axis of the driver shaft (9) to engage or disengage the follower (2), and wherein the follower (2) is configured to rotate concentrically together with the driver assembly when engaged with the coupler (3) and wherein the follower (2) is configured to stay disconnected from the driver assembly when disengaged from the coupler (3).

The clutch assembly as disclosed above, further comprising a power source (8), wherein the power source is operably connected to the coupler (3) and is configured to move the coupler (3) along the central axis of the driver shaft (9) causing the coupler to disengage from or engage with the follower (2). In one embodiment, the power source (8) is an electric motor. In another embodiment, the power source (8) is a manually operated device.

In one embodiment, the power source (8) is operably connected to an actuating arm (4), wherein the actuating arm (4) is operably connected to the coupler (3), wherein the power source (8) is configured to move the actuating arm (4), which causes the coupler (3) to move along the central axis of the driver shaft (9) disengaging from or engaging with the follower (2).

In one embodiment, the power source (8) is a motor, wherein the motor comprises a rotation shaft (7), and wherein the rotation shaft (7) is operably connected to the actuating arm (4) and is configured to rotate with the actuating arm (4).

In one embodiment, the actuating arm (4) has a first end and the second end, wherein the first end is operably connected the rotation shaft (7), wherein the second end is operably connected to the coupler (3).

In one embodiment, the first end comprises a spring (6) and the spring (6) is configured to rotate with the rotation shaft (7) causing movement on the actuating arm (4), and wherein the second end comprises a hook (5) hooking on the coupler (3).

In one embodiment, the driver shaft (9) has a polygon-shaped cross-section. For example, the polygon may be a triangle, a square, a rectangle, a tetrahedral, a pentagon, a hexagon, a heptagon, or an octagon.

In one embodiment, the coupler (3) comprises a polygon-shaped central bore (16), and wherein the coupler (3) is threaded onto the driver shaft (9) through the polygon-shaped central bore (16).

In one embodiment, the coupler (3) comprises a first coupling structure (12), wherein the follower (2) comprises a second coupling structure (15), wherein the first coupling structure (12) is configured to engage with the second coupling structure (15), and wherein the coupler (3) and the follower (2) are configured to rotate concentrically together when the first and the second coupling structure are engaged.

In one embodiment, the first coupling structure (12) comprises at least one protruding structure, wherein the second coupling structure (15) comprises at least one indenting structure, and wherein the protruding structure is configured to mate with the indenting structure.

In one embodiment, the coupler (3) comprises a first coupling structure (12), wherein the follower (2) comprises a second coupling structure (15), wherein the first coupling structure (12) is configured to mate with the second coupling structure (15).

In one embodiment, the clutch assembly further comprises a clutch or a deadbolt operably connected to the follower (2), wherein the rotation of the follower (2) is configured to produce a linear motion on the clutch or the deadbolt.

In one embodiment, the clutch assembly further comprises a control member (11), wherein the control member (11) is operably coupled to the driver (1) such that the control member (11), the driver (1), the driver shaft (9) and the coupler (3) are configured to rotate concentrically together.

In one embodiment, the follower (2) is configured to rotate concentrically together the control member (11), the driver (1), the driver shaft (9), and the coupler (3) when the coupler (3) is engaged with the follower (2) and wherein the follower (2) is configured to be disconnected from the control member (11), the driver (1), the driver shaft (9) and the coupler (3) when the coupler (3) is disengaged from the follower (2).

In one embodiment, the clutch assembly further comprises a clutch or a deadbolt operably connected to the follower (2), wherein the rotation of the control member (11) is configured to produce a linear motion on the clutch or the deadbolt when the coupler (3) is engaged with the follower (2).

In one embodiment, the control member is a knob, a handle, a round structure, an oval structure, an oblong structure, or a polygon structure.

A lock system, comprises the clutch assembly as disclosed herein, wherein rotating the control member (11) is configured to retract and extend the clutch or the deadbolt when the coupler (3) is engaged with the follower (2), and wherein the control member (11) is disconnected from the clutch or the deadbolt when the coupler (3) is disengaged from the follower (2).

In one embodiment, the lock system further comprises an authenticating device, wherein the authenticating device is configured to authenticate an operator and to control the engagement and disengagement between the coupler (3) and the follower (2) therefore connecting and disconnecting the control member (11) with the clutch or deadbolt.

In one embodiment, when the authenticating device authenticates the operator, the coupler (3) engages with the follower (2) allowing the operator to extend and retract the clutch or deadbolt by rotating the control member (11).

In one embodiment, the authenticating device comprises a key operated lock mechanism, a biometric authenticating mechanism, a passcode authenticating mechanism, or a wireless sensing device.

In one embodiment, the lock system comprises at least two of the authenticating devices selected from a key operated lock mechanism, a biometric authenticating mechanism, a passcode authenticating mechanism, or a wireless sensing device.

In one embodiment, the lock system comprises at least three of the authenticating devices selected from a key operated lock mechanism, a biometric authenticating mechanism, a passcode authenticating mechanism, or a wireless sensing device.

In one embodiment, the biometric sensing mechanism is configured to authenticate a fingerprint, an iris pattern, a cardio-electromagnetic wave, a voice, a sound combination, a gesture, or a combination thereof.

In one embodiment, the wireless sensing device is configured to receive an authenticating signal from a mobile device.

In one embodiment, the authenticating signal from a mobile device comprises an authenticating signal derived from authenticating a fingerprint, an iris pattern, a cardio-electromagnetic wave, a voice, a sound, a gesture, or a combination thereof.

A clutch assembly for a lock comprises a control member (11); a driver (1), having a driver shaft (9); a coupler (3), having a first coupling structure, wherein the coupler (3), the driver (1) and the control member (11) are configured to rotate concentrically together; a follower (2), having a second coupling structure, wherein the first coupling structure is configured to engage with the second coupling structure, wherein the follower (2) is configured to rotate concentrically together with or independently from the coupler (3), the driver (1) and the control member (11) when the first coupling structure is engaged with or disengaged from the second coupling structure, respectively; a motor (8) having a rotation shaft (7), wherein the motor (8) is configured to rotate the rotation shaft (7); and an actuating arm (4) having a first end and the second end, wherein the first end is operably connected to the rotation shaft (7), wherein the second end is operably connected to the coupler (3), wherein the motor is configured to rotate the first end of the actuating arm (4) through the rotation shaft (7) producing a swing motion at the second end of the actuating arm (4), wherein the swing motion at the second end of the actuating arm is configured to cause the coupler (3) to move back and forth along the central axis of the driver shaft (9) leading to the disengagement and engagement between the first and the second coupling structure.

In one embodiment, the first end of the actuating arm (4) comprises a spring (6) and wherein the first end is operably connected to the rotation shaft (7) by wounding the spring (6) onto to the rotation shaft (7).

In one embodiment, the coupler (3) comprises a groove (10), wherein the second end of the actuating arm (4) comprises a hook (5), and wherein the hook (5) is placed into the groove (10).

In one embodiment, the driver shaft (9) has a polygon-shaped cross-section, wherein the coupler (3) comprises a polygon-shaped central bore (16), wherein the coupler (3) is threaded onto the driver shaft (9) through the polygon-shaped central core (16) allowing the coupler to slide along the central axis of the driving shaft (9).

In one embodiment, the clutch assembly further comprises a clutch or a deadbolt operably connected to the follower (2), wherein, when the coupler (3) is disengaged from the follower (2), the control member (11) is disconnected from the clutch or the deadbolt, and wherein, when the coupler (3) is engaged with the follower (2), rotating the control member (11) is configured to produce a linear motion on the clutch or deadbolt.

A lock system having the clutch assembly as described herein, wherein, when the coupler (3) is engaged with the follower (2), rotating the control member (11) is configured to retract and extend the clutch or the deadbolt, and wherein, when the coupler (3) is disengaged from the follower (2), the control member (11) is disconnected from the clutch or the deadbolt.

In one embodiment, the lock system further comprises an authenticating device, wherein the authenticating device is configured to authenticate an operator and to control the engagement and disengagement between the coupler (3) and the follower (2) therefore connecting and disconnecting the control member (11) with the clutch or deadbolt.

In one embodiment, when the authenticating device authenticates the operator, the coupler (3) engages with the follower (2) allowing the operator to extend and retract the clutch or deadbolt by rotating the control member (11).

In one embodiment, the authenticating device comprises a key operated lock mechanism, a biometric authenticating mechanism, a passcode authenticating mechanism, or a wireless sensing device.

In one embodiment, the lock system comprising at least two of the authenticating devices selected from a key operated lock mechanism, a biometric authenticating mechanism, a passcode authenticating mechanism, or a wireless sensing device.

In one embodiment, the lock system comprises at least three of the authenticating devices selected from a key operated lock mechanism, a biometric authenticating mechanism, a passcode authenticating mechanism, or a wireless sensing device.

In one embodiment, the biometric authenticating mechanism is configured to authenticate a fingerprint, an iris pattern, a cardio-electromagnetic wave, a voice, a sound combination, a gesture, or a combination thereof.

In one embodiment, the wireless sensing device is configured to receive an authenticating signal from a mobile device.

In one embodiment, the authenticating signal from a mobile device comprises an authenticating signal derived from authenticating a fingerprint, an iris pattern, a cardio-electromagnetic wave, a voice, a sound, a gesture, or a combination thereof.

A lock system kit comprises the clutch assembly disclosed herein.

A door comprises the lock system disclosed herein.

A method for locking or unlocking a lock system as disclosed herein by an operator, comprising, authenticating the operator using the authenticating device; if the operator is authenticated, engaging the coupler (3) with the follower (2) and therefore operably connecting the control member (11) with the clutch or deadbolt, and turning the control member (11) to extend or retract the clutch or deadbolt and therefore lock or unlock the lock system.

In one embodiment, authenticating the operator comprising authenticating a biometric signal from the operator using the authenticating device.

In one embodiment, authenticating the operator comprising authenticating a passcode input from the operator using the authenticating device.

DETAILED DESCRIPTION OF THE DRAWINGS

The foregoing and other features of this disclosure will become more fully apparent from the following description and appended claims, taken in conjunction with the accompanying drawings. Understanding that these drawings depict only several embodiments arranged in accordance with the disclosure and are, therefore, not to be considered limiting of its scope, the disclosure will be described with additional specificity and detail through use of the accompanying drawings, in which:

DETAILED DESCRIPTION

Figure 1:
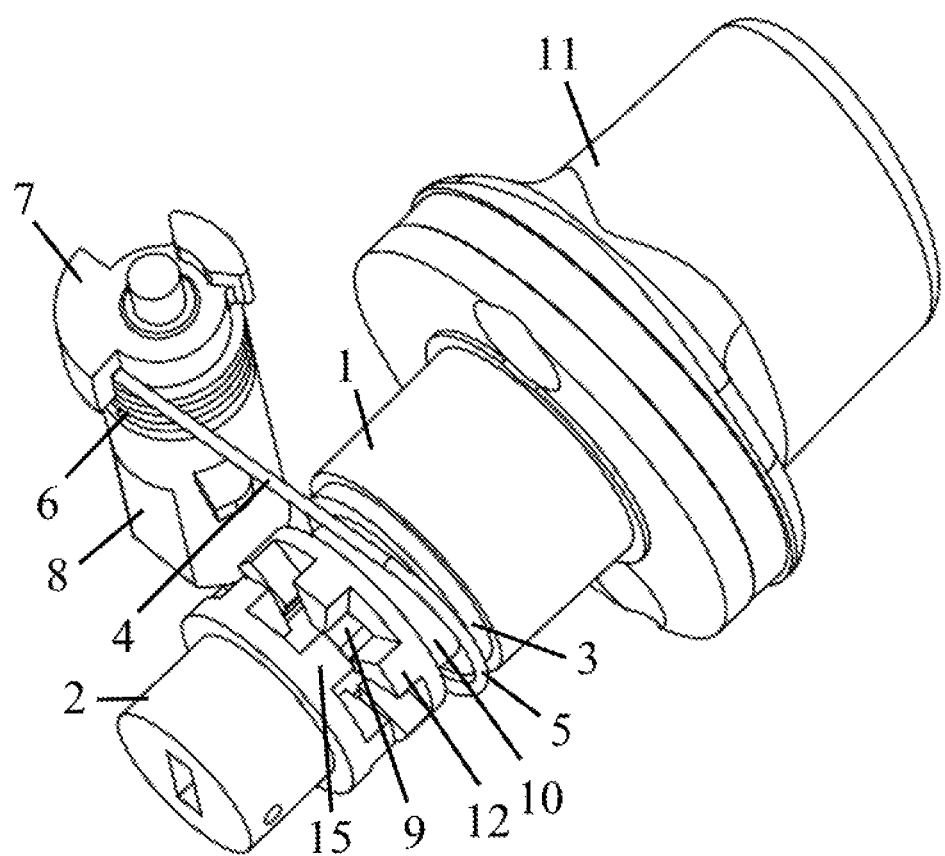
FIG. 1 shows an example clutching assembly when the coupler (3) and the follower (2) are disengaged.
Figure 2:
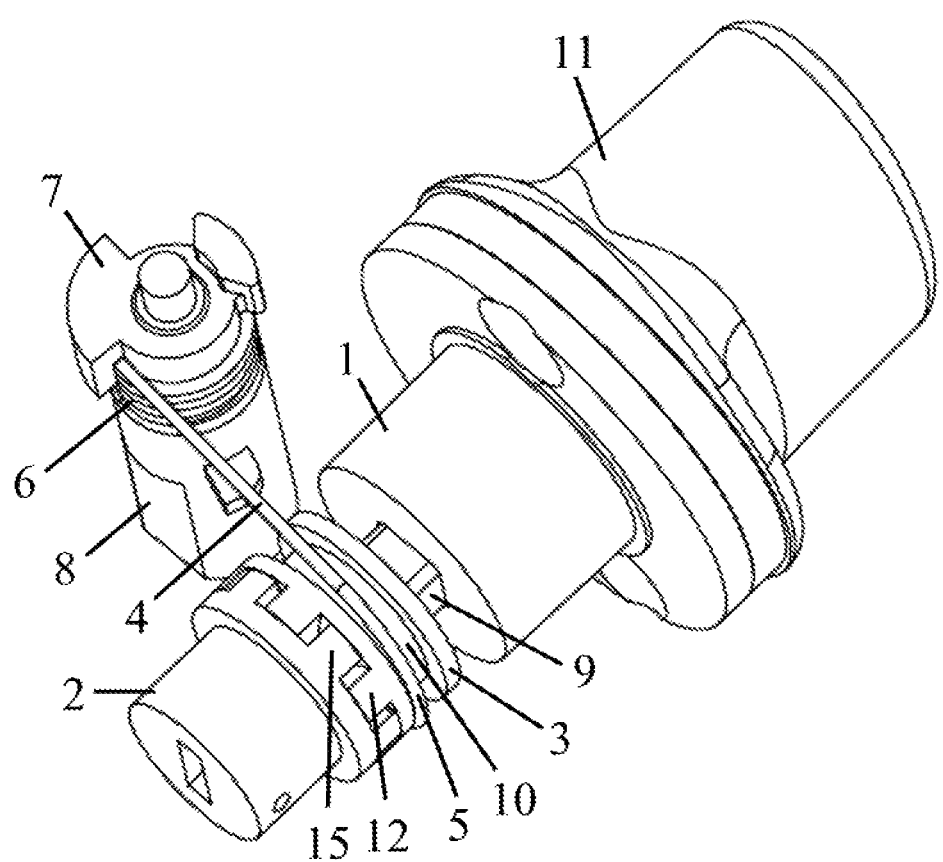
FIG. 2 shows an example clutching assembly when the coupler (3) and the follower (2) are engaged.
Figure 3:
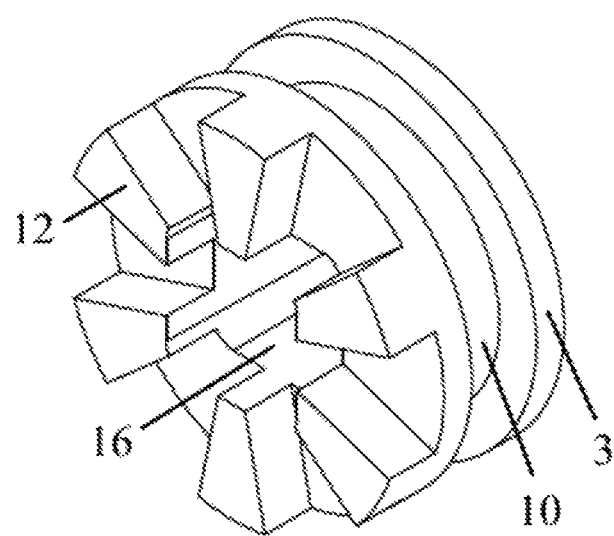
FIG. 3 shows an example coupler (3) having a polygon-shaped central bore (16) and a first coupling structure (12)
Figure 4:
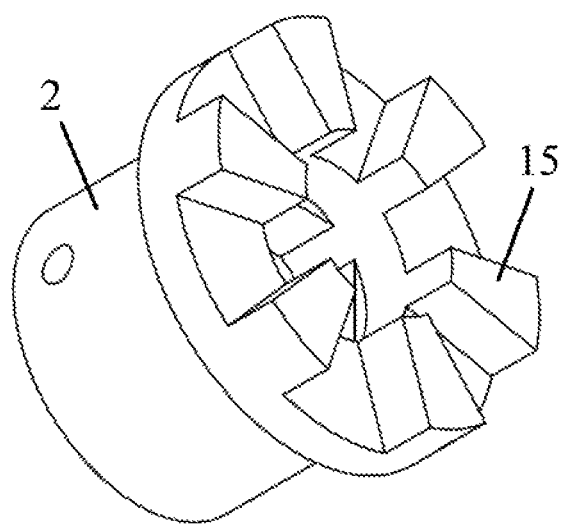
FIG. 4 shows an example follower (2) having a second coupling structure (15)
Figure 5:
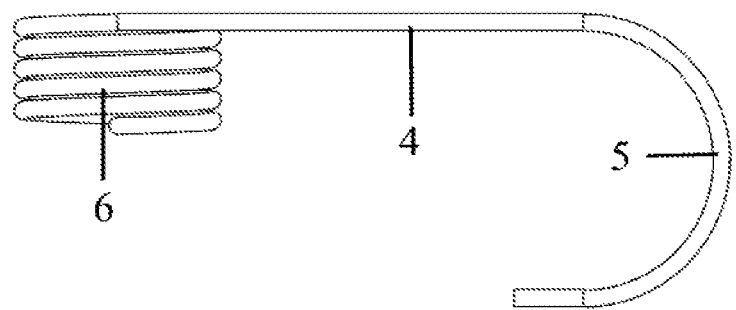
FIG. 5 shows an example actuating arm (4) having a first end comprising a spring (6) and a second end comprising a hook (5)
Figure 6:
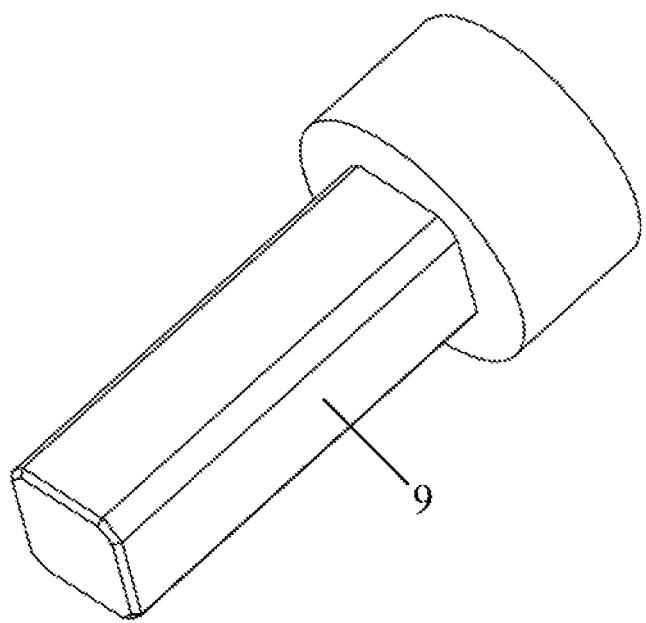
FIG. 6 shows an example polygon-shaped driver shaft (9).

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, among others, to clutching assemblies or mechanisms, locks containing the clutching mechanism, and methods, apparatus, systems, and/or devices related to the locks and the clutching mechanism clutches. For example, the present disclosure relates generally to lock systems which may be employed with entry control devices to control access through a door or to furniture. The clutch assemblies and lock systems containing the clutching assemblies provided in this disclosure may have the advantage of, without limitation, simple, durable, easy to use, and low production cost.

In one aspect, the clutch assemblies for locks are provided. In one embodiment, the clutch assembly includes a control member (11), a driver (1) and a coupler (3). The driver may have a driver shaft (9). The coupler (3), the driver (1) and the control member (11) are configured to rotate concentrically together. The coupler (3) may have a first coupling structure. The clutch assembly further includes a follower (2) having a second coupling structure. The first coupling structure is configured to engage with the second coupling structure. When the first coupling structure engages with the second coupling structure, the follower (2) is configured to rotate concentrically together with the coupler (3), the driver (1) and the control member (11). When the first coupling structure disengages from the second coupling structure, the follower (2) is disconnected from the coupler (3), the driver (1) and the control member (11).

The clutch assembly may further include a motor (8) having a rotation shaft (7). The motor (8) is configured to rotate the rotation shaft (7). An actuating arm (4) is operably connected to the rotation shaft (7) through a first end and to the coupler (3) through a second end. The motor is configured to rotate the first end of the actuating arm (4) through the rotation shaft (7) producing a swing motion at the second end of the actuating arm (4). The swing motion at the second end of the actuating arm is configured to cause the coupler (3) to move back and forth along the central axis of the driver shaft (9). Moving the coupler (3) forward toward the follower (2) causes the first coupling structure of the coupler (3) to engage with the second coupling structure of the follower (2) and therefore operably connects the coupler (3) with the follower (2). Move the coupler (3) back away from the follower (2) causes the first coupling structure to disengage from the second coupling structure and therefore operably disconnects the coupler (3) from the follower (2).

In one embodiment, the first end of the actuating arm (4) may include a spring (6). The first end is operably connected to the rotation shaft (7) by wounding the spring (6) onto to the rotation shaft (7). In one embodiment, the coupler (3) has a groove (10) and the second end of the actuating arm (4) has a hook (5). The coupler (3) is operably connected to the actuating arm (4) by looping the hook (5) into the groove (10).

In one embodiment, the driver shaft (9) has a polygon-shaped cross-section. The coupler (3) may include a polygon-shaped central bore (16). The coupler (3) is threaded onto the driver shaft (9) through the polygon-shaped central core (16) allowing the coupler to slide along the central axis of the driver shaft (9).

In one embodiment, the clutch assembly further includes a clutch or a deadbolt operably connected to the follower (2). When the coupler (3) is disengaged from the follower (2), the control member (11) is disconnected from the clutch or the deadbolt. When the coupler (3) is engaged with the follower (2), rotating the control member (11) is configured to produce a linear motion on the clutch or deadbolt.

In another aspect, the disclosure provides lock systems having the above described clutches and clutch mechanisms. The lock systems may be a lock system, a furniture lock, a vehicle lock, or a bike lock. In one embodiment, when the coupler (3) is engaged with the follower (2), rotating the control member (11) is configured to retract and extend the clutch or the deadbolt of the locking system therefore unlocking or locking the system. When the coupler (3) is disengaged from the follower (2), the control member (11) is disconnected from the clutch or the deadbolt.

In one embodiment, the lock system may include an authenticating device. In one embodiment, the authenticating device is configured to authenticate an operator and to control the engagement and disengagement between the coupler (3) and the follower (2) therefore connecting and disconnecting the control member (11) with the clutch or deadbolt. For example, when the authenticating device authenticates the operator, the coupler (3) engages with the follower (2) allowing the operator to extend or retract the clutch or deadbolt by rotating the control member (11) and therefore lock or unlock the lock system.

In some embodiments, the authenticating device may include a key operated lock mechanism, a biometric authenticating mechanism, a passcode authenticating mechanism, or a wireless sensing device. An example lock may include at least two or at least three of the authenticating devices described thereof. The authenticating device may be wirelessly controlled by a wireless sensing device. For example, the wireless sensing device is configured to receive an authenticating signal from a mobile device. The authenticating signal may be derived from authenticating a fingerprint, an iris pattern, a cardio-electromagnetic wave, a voice, a sound, a gesture, or a combination thereof.

In a further aspect, the disclosure provides methods for locking or unlocking a lock system by an operator incorporating the clutch assemblies described therein. In one embodiment, the method includes authenticating the operator using the authenticating device; if the operator is authenticated, engaging the coupler (3) with the follower (2) and therefore operably connecting the control member (11) with the clutch or deadbolt; and turning the control member (11) to extend or retract the clutch or deadbolt and therefore lock or unlock the lock system. In one embodiment, authenticating the operator includes authenticating a biometric signal from the operator using the authenticating device. In one embodiment, the authenticating the operator comprising authenticating a passcode input from the operator.

In a further aspect, the disclosure provides doors, furniture, bikes, buildings, apparatus, devices, and systems having locks with the above described clutches and clutch assemblies.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, may be arranged, substituted, combined, separated, and designed in a wide variety of different configurations, all of which are explicitly contemplated herein.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components. In addition, the "operably coupled," "operably connected," "coupled," or "connected" may be either directly coupled or connected or indirectly coupled or connected.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, may be arranged, substituted, combined, separated, and designed in a wide variety of different configurations, all of which are explicitly contemplated herein.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by prior disclosure.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A clutch assembly for a lock system, comprising,
   a driver assembly, comprising a driver (1), a driver shaft (9) as a single piece; and a coupler (3), wherein the driver (1), the coupler (3) and the driver shaft (9) are configured to rotate concentrically together;
   a follower (2), wherein the coupler (3) are configured to move along the central axis of the driver shaft (9) to engage or disengage the follower (2), and wherein the driver shaft (9) does not extend through the follower (2), and wherein follower (2) and is configured to rotate concentrically together with the driver assembly when engaged with the coupler (3) and wherein the follower (2) is configured to stay disconnected from the driver assembly when disengaged from the coupler (3), and
   a power source (8), wherein the power source (8) is operably connected to the coupler (3) and is configured to move the coupler (3) along the central axis of the driver shaft (9) causing the coupler to disengage from or engage with the follower (2), wherein the power source (8) is operably connected to an actuating arm (4), wherein the actuating arm (4) is operably connected to the coupler (3), wherein the power source (8) is configured to move the actuating arm (4), which causes the coupler (3) to move along the central axis of the driver shaft (9) disengaging from or engaging with the follower (2), and wherein the power source (8) comprises a rotation shaft (7), wherein the actuating arm (4) having a first end comprising a spring (6) and a second end comprising a hook (5), and wherein the rotation shaft (7) is operably connected to the actuating arm (4) by wounding the spring (6) onto to the rotation shaft (7) and is configured to rotate with the actuating arm (4).

2. The clutch assembly of claim 1, wherein the driver shaft (9) has a polygon-shaped cross-section, wherein the coupler (3) comprises a polygon-shaped central bore (16) and a groove (10), wherein the coupler (3) is threaded onto the driver shaft (9) through the polygon-shaped central bore (16), and wherein the coupler (3) is operably connected to the actuating arm (4) by looping the hook (5) into the groove (10).

3. A clutch assembly for a lock, comprising,
   a control member (11);
   a driver (1), having a driver shaft (9) as a single piece;
   a coupler (3), having a first coupling structure (12) and a groove (10), wherein the coupler (3), the driver (1) and the control member (11) are configured to rotate concentrically together;
   a follower (2), having a second coupling structure (15), wherein the driver shaft (9) does not extend through the follower (2), wherein the first coupling structure (15) is configured to engage with the second coupling structure, wherein the follower (2) is configured to rotate concentrically together with or independently from the coupler (3), the driver (1) and the control member (11) when the first coupling structure is engaged with or disengaged from the second coupling structure, respectively;
   a motor (8) having a rotation shaft (7), wherein the motor (8) is configured to rotate the rotation shaft (7); and
   an actuating arm (4) having a first end and the second end, wherein the first end comprises a spring (6) and is operably connected to the rotation shaft (7) by wounding the spring (6) onto to the rotation shaft (7), wherein the second end has a hook (5), wherein the second end is operably connected to the coupler (3) by looping the hook (5) into the groove (10), wherein the motor is configured to rotate the first end of the actuating arm (4) through the rotation shaft (7) producing a swing motion at the second end of the actuating arm (4), wherein the swing motion at the second end of the actuating arm is configured to cause the coupler (3) to move back and forth along the central axis of the driver shaft (9) leading to the disengagement and engagement between the first and the second coupling structure.

4. The clutch assembly of claim 3, wherein the driver shaft (9) has a polygon-shaped cross-section, wherein the coupler (3) comprises a polygon-shaped central bore (16), wherein the coupler (3) is threaded onto the driver shaft (9) through the polygon-shaped central core (16) allowing the coupler to slide along the central axis of the driving shaft (9).

5. The clutch assembly of claim 3, further comprising a clutch or a deadbolt operably connected to the follower (2), wherein, when the coupler (3) is disengaged from the follower (2), the control member (11) is disconnected from the clutch or the deadbolt, and wherein, when the coupler (3) is engaged with the follower (2), rotating the control member (11) is configured to produce a linear motion on the clutch or deadbolt.

* * * * *